Nov. 3, 1942.    R. B. SMITH    2,300,985
DISTILLATION
Filed Dec. 28, 1939    2 Sheets-Sheet 1
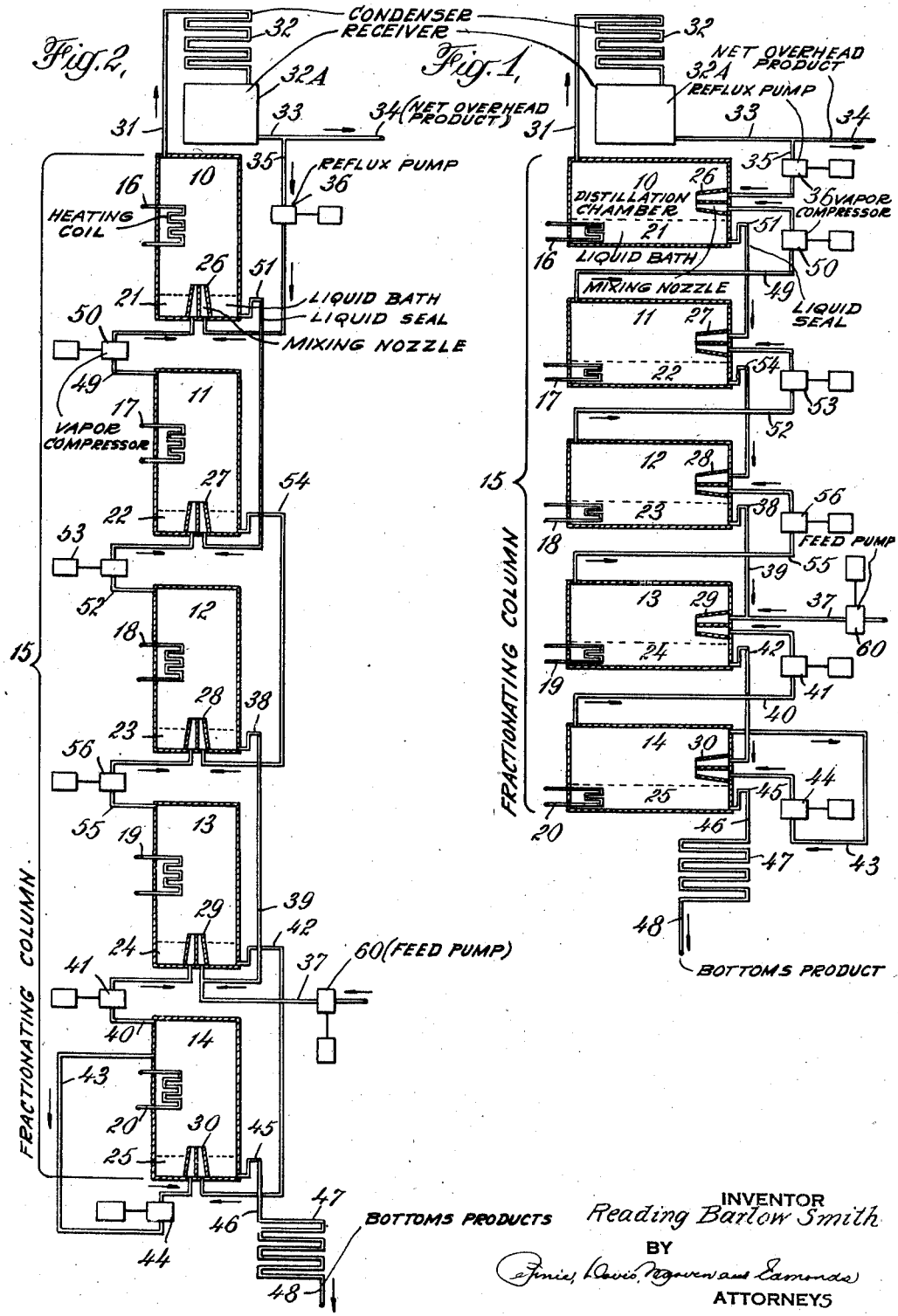
INVENTOR
Reading Barlow Smith
BY
ATTORNEYS

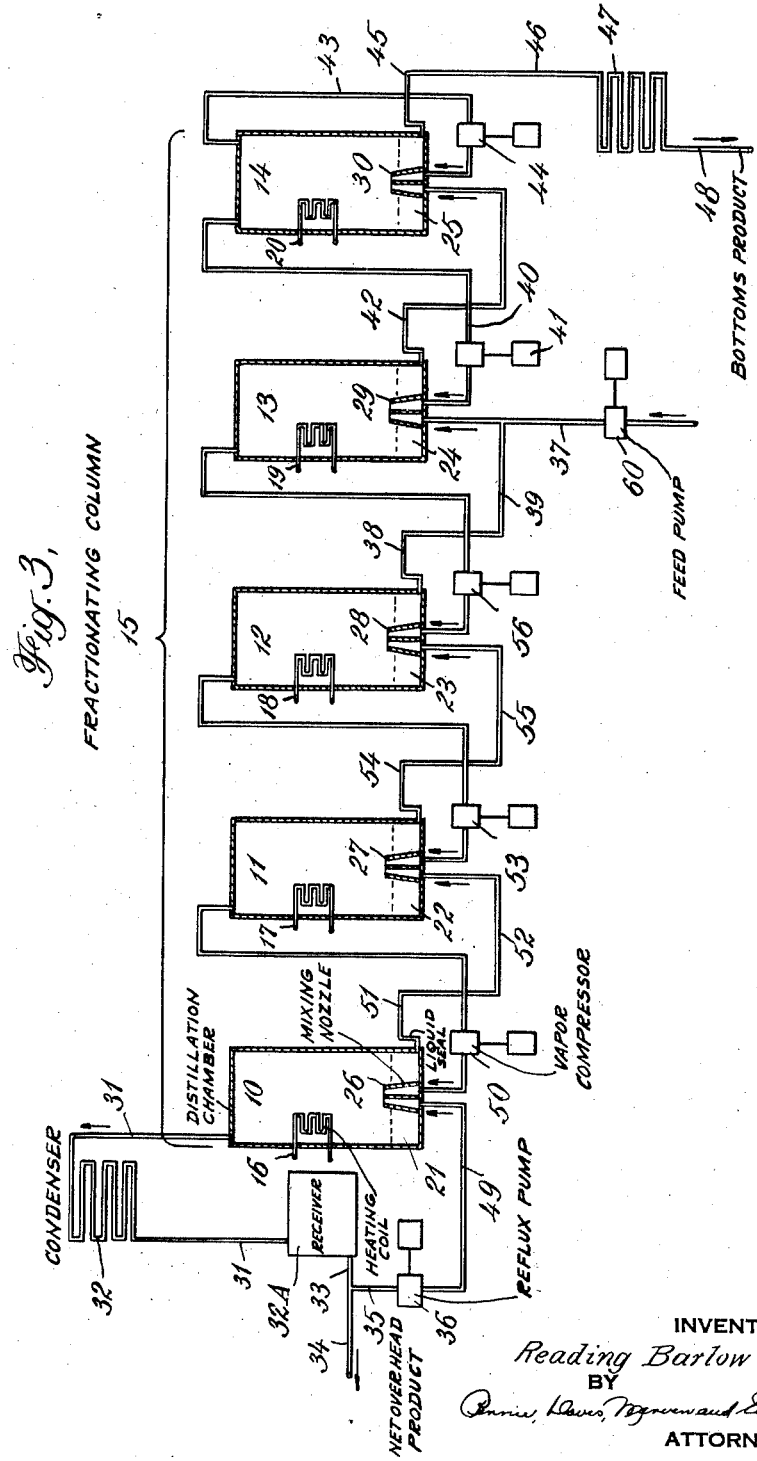

Patented Nov. 3, 1942

2,300,985

UNITED STATES PATENT OFFICE 2,300,985

DISTILLATION

Reading Barlow Smith, Hammond, Ind., assignor to Sinclair Refining Company, New York, N. Y., a corporation of Maine Application December 28, 1939, Serial No. 311,238

5 Claims. (Cl. 261—21)

This invention relates to fractional distillation, particularly multi-stage fractional distillation, and aims to provide improvements in apparatus for fractional distillation as conducted in a series of stages.

In multi-stage fractional distillation systems, such for example as rectifying columns, separation of constituents having different boiling points is rendered more thorough by carrying on distillation in a series of stages through which liquid and vapor components pass in countercurrent to each other. Customarily, a mixture of the constituents, either in a liquid or vapor state, as introduced into a mid-stage, and in each stage opportunity is provided for contact and heat interchange between the liquid and vapor components present at that stage. A decreasing thermal gradient is maintained from one end of the system to the other, with withdrawal of the higher-boiling constituent at the hotter end of the system and withdrawal of the constituent of lower-boiling point at the cooler end of the system. In the successive stages toward the cooler end of the system, the higher-boiling point constituent tends to condense and to release heat which brings about vaporization of the lower-boiling point constituent, with the result that, in successive stages toward the point of withdrawal of the lower-boiling constituent (for example, the top of a rectifying column) there is an increased concentration of the lower-boiling constituent and a decreased concentration of the higher-boiling constituent. Condensate produced in the system is refluxed as liquid through the several stages toward the hotter end of the system, and in so doing passes in countercurrent contact with vapors traveling in the opposite direction. Customarily, the contact between vapors and liquids in the system is rendered intimate by means of bubble plates and the like, which offer resistance to the passage of gases with the result that the pressure within the series of stages increases toward the point of withdrawal of the higher-boiling point constituent.

My invention involves radical departure from this customary practice. Thus, in a process of fractional distillation involving distillation of a mixture in a series of stages with liquid portions of said mixture refluxing through the series in countercurrent with vaporized portions of the mixture and withdrawal of a high-boiling fraction as liquid from one end of the series and withdrawal of a low-boiling fraction as vapor from the other end of the series, my invention contemplates maintaining successively greater pressures in successive stages of the series toward the point of withdrawal of the low-boiling fraction. The successively greater pressures are maintained by pumping the vaporized portions from stage to stage through the series toward the point of withdrawal of the low-boiling fraction.

In other words, my invention involves the maintenance of an increasing pressure gradient through a series of distillation stages in which reflux passes in countercurrent to vapors, the increase in pressure being toward that end of the series to which the fraction of lower-boiling point migrates as vapor, the increased pressure in successive stages being maintained by means of vapor compressors interposed between stages.

My invention contemplates, in apparatus for fractional distillation, the combination which comprises a series of chambers, means for introducing a mixture to be fractionated into at least one of said chambers, means for passing liquid portions of the mixture successively through the series of chambers, conduits for passing vaporized portions of the mixture successively through the series of chambers, the direction of vapor passage being countercurrent to the direction of passage of liquid portions through the series, vapor pumping means disposed between the chambers of the series for forcing the vapor portions through the conduits from chamber to chamber, means for bringing the liquid portions into intimate contact with the vaporized portions in each of the successive chambers comprising a plurality of mixing nozzles each of which is connected to a vapor-carrying conduit passing to a chamber of the series and to the means for passing liquid to the same chamber of the series, means for withdrawing a liquid fraction of the mixture from the end of the series of chambers toward which the liquid portions travel, and means for withdrawing a vapor fraction of the mixture from the opposite end of said series.

The vapor pumping means in the system (by maintaining a positive differential between chambers) tends to force the liquid through the series in countercurrent with the vapors. To prevent the backward flow of vapor through the series, my invention preferably includes a series of liquid carrying pipes connected between pairs of the chambers, each pipe being provided with a liquid seal having an effective head corresponding at least to the differential pressure existing between the chambers that this pipe connects.

An intimate mixture of liquid and vapor portions in the several chambers is obtained with mixing nozzles associated with the chambers, each nozzle being fed with the liquid portion and the vapor portion introduced into the respective chamber.

Preferably, the apparatus is provided with a condenser for condensing the vapor fraction withdrawn from one end of the series, with a conduit for conducting the refluxed portion of the condensed vapor into the end portion of the series from which the vapor fraction was withdrawn. Preferably also, a pump is provided in this conduit for forcing the refluxed portion back into the series and for maintaining the relatively high pressure at that end of the series from which the vapor fraction is withdrawn.

A mixture to be separated preferably is introduced into an intermediate chamber of the series and there mixed with both liquid reflux and vapor passing through the series in countercurrent with the reflux.

It is desirable to provide the apparatus of my invention with indirect heat exchanging means disposed in at least one of the chambers for exchanging heat between the contents of the chamber and an external medium. The heat exchanging means may conveniently comprise a coil disposed within the chamber having pipe connections projecting through a wall thereof, with means for circulating a heating or a cooling fluid through the coil. Thus, heating coils may be provided in all of the chambers of the series, if desired.

A large portion, and in certain cases, all of the energy for accomplishing the distillation may be supplied by the pumping system, mechanical energy expended to compress the gases being converted to heat absorbed by the gases. Hence, the work done in compression is not wasted, but, on the contrary, is usefully expended either to bring about distillation or to compensate for heat lost from the system by radiation, etc.

With certain types of feed the apparatus of my invention may be operated isothermally, with substantially the same temperature prevailing in the different stages, the energy for distillation being supplied in whole or in part by the compression of the gases in the several stages. In other cases it may be advantageous to operate the system with a substantial difference in temperature between the different stages, employing the pressure differentials between stages for maintaining a low pressure in the "stripping section" below the "feed plate" and for maintaining a high pressure in the "overhead" section, i. e., the chambers lying above the point of introduction of the feed. In still other cases, it may be desirable to operate the stripping section in the conventional manner with progressively increased pressures in the several stages of the section in the direction of the point of withdrawal of the bottoms product, but with progressively increased pressures in the several stages of the "overhead" section in the direction of the point of withdrawal of the distillate or "overhead" product.

The fractional distillation apparatus of my invention, in addition to improving the efficiency of distillation space as described hereinafter, has several distinct advantages, among them the following:

(1) It permits maintenance of a higher pressure at the "top" or distillate outlet end of a rectifying tower or other multi-stage fractionating system to aid in condensation of very volatile overhead products and thus aids in the recovery of these volatile products;

(2) At the same time, the invention permits maintenance of a low pressure or vacuum at the opposite end of the system, which aids evaporation in the stripping section of a rectifying column or its equivalent, so that low temperatures may be maintained in the stripping section—a desirable feature when high temperatures tend to bring about undesirable cracking, as may be the case when fractionating certain organic mixtures;

(3) The relatively small pressure differential between stages is achieved at relatively low cost, the total pressure increase of the several stages being obtained more efficiently and less expensively by stages than it would be in a single compression;

(4) The invention offers greater flexibility and ease of operation for a fractional distillation, since the pressures in the several stages may be maintained and adjusted independently of the pressures in the other stages, and thus permit control of fractionating conditions in the several stages independently of the thermal gradient through the system. To take a specific case, "lube oils" or other high-boiling feed stocks may be subjected to a high degree of vacuum in one or more stages of the stripping section of a fractionation system, thus facilitating distillation at a desirable low temperature, while a high pressure tending to bring about condensation and recovery of valuable low-boiling hydrocarbons is maintained at the point of distillate discharge at the other end of the system. Without the vapor compressors between stages, a vacuum in the stripping sections could only be produced at the expense of still lower pressure toward the point of distillate discharge and this lower pressure would tend to prevent condensation of the low-boiling hydrocarbons sought to be recvered; and (5) The employment of the vapor compressors and the consequent positive differential pressures between stages toward the point of discharge of distillate, tends to force distillate through the system in the opposite direction, so that the various stages may be placed side by side, rather than one above the other, with reflux being forced in the proper direction from stage to stage without recourse to any pumps other than the vapor compressors (see Fig. 3).

These and other features of my invention will be more thoroughly understood in the light of the following detailed description taken in conjunction with the accompanying figures which are diagrammatic representations of presently preferred forms of apparatus of my invention.

Referring now to Fig. 1, it will be observed that the apparatus comprises a series of distillation chambers 10, 11, 12, 13, 14 which conveniently may be superposed one upon the other to form a fractionating column 15. The respective chambers are provided with heating coils 16, 17, 18, 19, 20 disposed preferably in the lower portions of the chambers within liquid baths 21, 22, 23, 24, 25. Likewise, the respective chambers are provided with mixing nozzles 26, 27, 28, 29, 30 which are adapted to bring about intimate contact between liquid and vapor introduced into the chambers.

The uppermost chamber, chamber 10 is provided with a vapor outlet pipe 31 which extends from an upper portion of the chamber to a condenser coil 32 of conventional design. Vapors rising from the uppermost chamber are condensed in the coil and pass into the receiver 32A from whence the gross liquid overhead product is withdrawn through a pipe 33. The gross overhead product is divided into two portions. One portion is withdrawn from the system through a pipe 34 and constitutes the net overhead product; the remainder of the gross overhead product or reflux is returned to the uppermost chamber 10 through a pipe 35 and a pump 36 of conventional design for handling liquids.

The uppermost chamber of the series is maintained at the highest pressure, say, 100 mms. of mercury as measured by a manometer. The next lower chamber is maintained at a lower pressure, say 90 mms. Hg, progressively lower pressures of say 80 mms., 70 mms. and 60 mms., Hg being maintained in the remaining chambers 12, 13 and 14, respectively.

In the apparatus of Fig. 1, the second chamber 13 from the bottom constitutes the "feed plate" chamber of the rectifying column 15. Into this chamber is introduced the feed to be separated through a pipe line 37 and a feed pump 60. The feed, for example, a mixture of petroleum hydrocarbons to be subjected to fractionation, may be introduced into the system chamber either in liquid or vapor state. The feed is introduced into the chamber 13 through the mixing nozzle 29 and is there mixed thoroughly with reflux flowing under the influence of differential pressure from the pool 23 in the chamber 12. This reflux passes through a liquid seal 38 and a pipe 39 into the mixing nozzle. The feed is also mixed with vapors from the lowermost chamber 14, these gases being passed into the mixing nozzle through a pipe line 40 and a vapor compressor 41 which maintains within the chamber 13 a higher pressure than is maintained in the chamber 14.

Within the chamber 13 there occurs a vaporization of part of the liquid introduced thereinto either as reflux through the line 39 or as feed through the line 37. At the same time, a portion of the gases introduced into the chamber 13 from the chamber 14 are condensed and enter the pool 24. From the pool 24, a reflux flows through a liquid seal 42 into the mixing nozzle 30 of the lowermost chamber 14. In this chamber, vapor withdrawn from the chamber itself, or from an outside source (not shown) is passed through a pipe 43 and a vapor compressor 44 of any convenient form into the mixing nozzle 30 and there mixed with the reflux from the chamber 13. As in the case of chamber 13 (and, in fact, as in the case of all the chambers) a portion of the liquid introduced into the chamber 14 is vaporized and the remainder enters the pool 25 from whence it is withdrawn through a liquid seal 45 and a pipe 46 into a bottoms cooler 47 of conventional type. The liquid bottoms product, consisting essentially of the higher-boiling constituent of the feed, is withdrawn through a pipe line 48.

Now to follow the path of the reflux through the system in countercurrent with the rising vapors, it will be observed that the reflux drawn from the receiver 32A is forced by the reflux pump 36 into the mixing nozzle 26 of the chamber 10 and there mixed with vapor from the adjacent lower chamber 11. This vapor is withdrawn from an upper portion of the chamber 11 through a pipe 49 and is passed through a vapor compressor 50 into the nozzle 26. Fractionation occurs within the chamber 10 with vaporization of a portion of the reflux and condensation of a portion of the rising vapor. The condensed portion enters the pool 21 in the chamber and passes through a liquid seal 51 into the nozzle 27 of the next lower chamber 11. In this chamber the reflux, as in the previous cases, is mixed with vapor in the mixing nozzle 27, in this case with vapor withdrawn from the chamber 12 through a pipe 52 and a vapor compressor 53. Again heat interchange between liquid and vapor brings about vaporization of a portion of the reflux and condensation of a portion of the rising vapor. The resulting condensate enters the pool 22 and flows through a liquid seal 54 into the mixing nozzle 28 of the chamber 12 where it is mixed with vapor from the chamber 13 which passes through a vapor line 55 and a vapor condenser 56 to the mixing nozzle 28. Condensate from the chamber 12 flows, as indicated hereinbefore, as reflux through the liquid seal 38 into the mixing nozzle 29 of the chamber 13.

In the apparatus just described, it will be observed that vapors pass countercurrent through the series of chambers in an upward direction countercurrent to down flowing reflux. Conditions are so maintained in the lowermost of the chambers that all of the lower-boiling constituent, together with a considerable proportion of the higher-boiling constituent are vaporized at this point, leaving in the pool 25 a substantially pure bottoms product consisting of the higher-boiling constituent that is to be separated. On the contrary, in the uppermost of the chambers conditions are so maintained that all of the higher-boiling constituent which reaches that point together with a portion of the lower-boiling constituent is condensed either within the chamber 10 or, in the case of the lower-boiling point constituent, in the condenser 32. Maintenance of these conditions in the chamber 10 and its associated condenser permits the withdrawal as net overhead product of a substantially pure fraction of the lower-boiling constituent to be recovered. The intermediate chambers 11, 12 and 13, which may comprise any desired number, are maintained under such conditions that the reflux passing through them becomes enriched with the higher-boiling point constituent, the gases passing through them becoming enriched in the lower-boiling point constituent, as in heretofore customary fractional distillation systems, such as conventional rectifying columns.

Part of the heat of distillation may be, and usually is, furnished by the heating coils 16, 17, 18, 19 and 20. However, in certain instances, it may be desirable to circulate a cooling medium rather than a heating medium through the coils, particularly the coils of the upper chambers, so as to assure the production of a pure overhead product.

It will be observed that, except for the uppermost chamber, no pumps are provided for introducing the reflux into the successive chambers. And no pumps are necessary because the difference in pressure between chamber 10 and chamber 11, and, in fact, between each of the pairs of chambers is such as to force the liquid through the liquid seal into the nozzle. The liquid seals between each pair of chambers should have an effective depth slightly greater than the differential pressure head that is to be maintained between these chambers by means of the vapor compressors, so as to avoid the leakage of vapors backward in the system through the conduits designed to carry the liquid reflux.

It is not necessary that the several chambers of the fractionating system of my invention be superposed one upon the other, if means, such as pumps, are provided for moving the reflux through the system countercurrent to the direction of vapor passage, or if the differential pressure between chambers is sufficient to force the liquid upwardly from one chamber to the next.

In the apparatus illustrated, in Fig. 1, it will be observed that the mixing nozzles are disposed in the side wall of the chamber, with liquid being withdrawn from the chamber through a liquid seal adjacent the bottom thereof and with vapor being withdrawn from the chamber through a pipe at the top of the chamber remote from the nozzle. The fact that both liquid and vapor are supplied to the several chambers at relatively high differential pressure, makes possible the employment of a mixing nozzle or other efficient dispersing apparatus. And the extremely intimate admixture thus obtainable is highly desirable, for equilibrium between vapors and liquids in the chambers may be substantially attained thereby, so that the various chambers operate as substantially "perfect trays." In short, the use of the mixing nozzles which in turn is made possible by the use of vapor compressors tends to increase the efficiency of the system so that more perfect fractionation can be obtained in minimum space.

The mixing nozzles need not be disposed at the side of the chamber, as shown, but may be placed at any convenient point within the chamber, and may be pointed upwardly or downwardly as may be most convenient. Likewise, the heating coils need not be disposed in the liquid baths and may be disposed in the vapor spaces in the upper portions of the several chambers.

Fig. 2 illustrates a modification of the apparatus of Fig. 1 (like parts being designated by the same numbers as in Fig. 1) in which the mixing nozzles project upwardly from the bottoms of the chambers through the liquid baths, the heating coils being disposed in the vapor spaces overlying the baths.

Fig. 3 illustrates a further modification of the apparatus of Fig. 1 (like parts being designated by the same numbers as in Fig. 1) but in which the distillation chambers are arranged side by side. In this arrangement it will be observed that the nozzles for mixing liquid portions and vapor portions project upwardly in the several chambers to a point above the level of liquid therein. The liquid is withdrawn from the chambers through liquid seals and forced through pipes into an adjacent chamber by means of the higher pressure prevailing in the chamber from which the liquid is withdrawn, this higher pressure being maintained by means of the vapor compressors.

Any one of a number of forms of mixing nozzles, such, for example, as Venturi tube eductors may be employed.

If desired, the liquid seals in the conduits for carrying liquids between the chambers may be omitted, and valves may be placed in the system at various points to govern the flow of liquids and vapors therethrough as will be understood by those skilled in the art. As indicated hereinbefore, the liquid seals (if employed) should have an effective depth slightly in excess of the head of liquid required to balance the difference in pressure existing between the chambers connected through the seal.

As indicated hereinbefore, my invention affords particular advantages in the fractionation of mixtures of petroleum hydrocarbons. For example, it may be employed to advantage in the treatment of wet gases from refinery or field, the wet gas being introduced directly into the apparatus. Stabilized casing head gasoline is produced as a bottoms product while the dry gases are taken off as a net overhead product.

I claim:

1. In apparatus for fractional distillation, the combination which comprises a series of distillation chambers, means for introducing a mixture to be fractionated into one of said chambers, pipes for passing liquid portions of the mixture successively through the series of chambers, conduits for passing vaporized portions of the mixture successively through the series of chambers in countercurrent to the liquid portions, means for bringing the liquid portions into intimate contact with the vaporized portions in each of the successive chambers comprising a plurality of mixing nozzles each of which is connected to a vapor-carrying conduit passing to a chamber of the series and to a liquid-carrying pipe passing to the same chamber of the series, a plurality of vapor pumping means connected respectively between the chambers of the series in the vapor-carrying conduits before the mixing nozzles for forcing the vapor and the liquid portions through the conduits and the nozzles from chamber to chamber, liquid seals disposed in the liquid-carrying pipes before the nozzles, means for withdrawing a liquid fraction of the mixture from the end of the series of chambers toward which the liquid portions travel, and means for withdrawing a vapor fraction of the mixture from the opposite end of said series.

2. In apparatus for fractional distillation, the combination which comprises a series of chambers, means for introducing a mixture to be fractionated into one of said chambers, means for passing liquid portions of said mixture successively through the series of chambers which means comprises a series of pipes connected between pairs of the chambers, each pipe being provided with a liquid seal, conduits for passing vaporized portions of the mixture successively through the series of chambers in a direction countercurrent to that of the liquid portions, means for bringing the liquid portions into intimate contact with the vaporized portions in each of the successive chambers comprising a plurality of mixing nozzles each of which is connected to a vapor-carrying conduit passing to a chamber of the series and to a liquid-carrying pipe passing to this chamber, a plurality of vapor pumping means connected respectively between the chambers of the series for forcing the vapor portions through the conduits from chamber to chamber, a plurality of liquid seals each of which is disposed in a liquid-carrying pipe passing to a mixing nozzle of the series, means for withdrawing a liquid fraction of the mixture from the end of the series of chambers toward which the liquid portions travel, and means for withdrawing a vapor fraction of the mixture from the opposite end of said series.

3. In apparatus for fractional distillation the combination which comprises a series of chambers, means for introducing a mixture to be fractionated into an intermediate chamber of the series, pipes for passing liquid portions of the mixture successively through the series of chambers, conduits connecting adjacent chambers of the series for passing vaporized portions of the mixture successively through the series of chambers in countercurrent to the liquid portions, means for bringing the liquid portions into intimate contact with the vaporized portions in each of the successive chambers comprising mixing nozzles connected to the respective vapor-carrying conduits and to the respective liquid-carrying pipes supplying the respective chambers, a plurality of vapor pumping means connected respectively between the chambers of the series for forcing the vapor and liquid portions through the mixing nozzles from chamber to chamber, a plurality of liquid seals connected in the respective pipes before the respective mixing nozzles, each seal having an effective depth greater than the differential pressure head maintained between adjacent chambers by the vapor pumping means supplied by the pipe in which the liquid seal is connected, means for withdrawing a liquid fraction of the mixture from the end of the series of chambers toward which the liquid portions travel, and means for withdrawing a vapor fraction of the mixture from the opposite end of said series.

4. In apparatus for fractional distillation, the combination which comprises a series of distillation chambers, means for introducing a mixture to be fractionated into one of said chambers, pipes for passing liquid portions of the mixture successively through the series of chambers, conduits for passing vaporized portions of the mixture successively through the series of chambers in countercurrent to the liquid portions, means for bringing the liquid portions into intimate contact with the vaporized portions in each of the successive chambers comprising a series of mixing nozzles each connected to a vapor-carrying conduit and a liquid-carrying pipe which supply a chamber of the series, a plurality of vapor pumping means connected respectively between the chambers of the series for forcing the vapor and liquid portions through the mixing nozzles from chamber to chamber, a plurality of liquid seals connected in the respective pipes before the respective mixing nozzles, each seal having an effective depth greater than the differential pressure head maintained between adjacent chambers by the vapor pumping means supplied by the pipe in which the liquid seal is connected, means for withdrawing a liquid fraction of the mixture from the end of the series of chambers toward which the liquid portions travel, means for withdrawing a vapor fraction of the mixture from the opposite end of said series, a condenser for condensing the vapor fraction thus withdrawn, a conduit for conducting a refluxed portion of the condensed vapor into the end portion of the series from which the vapor fraction is withdrawn and pumping means disposed in said conduit for forcing the refluxed portion into said end portion.

5. In apparatus for fractional distillation, the combination which comprises a series of distillation chambers, means for introducing a mixture to be fractionated into one of said chambers, series of pipes for passing liquid portions of the mixture successively through the series of chambers, a series of conduits for passing vaporized portions of the mixture successively through the series of chambers in countercurrent to the liquid portions, means for bringing the liquid portions into intimate contact with the vaporized portions in each of the successive chambers comprising a series of mixing nozzles connected respectively to the vapor-carrying conduit and the liquid-carrying pipe which supply a chamber of the series, a plurality of vapor pumping means connected respectively between the chambers of the series before the mixing nozzles for forcing the vapor portions through the conduits from chamber to chamber, a plurality of liquid seals connected respectively in the pipes before the mixing nozzles, each seal having an effective depth greater than the differential pressure head maintained between adjacent chambers by the vapor pumping means supplied by the pipe in which the liquid seal is connected, means for withdrawing a liquid fraction of the mixture from the end of the series of chambers toward which the liquid portions travel, means for withdrawing a vapor fraction of the mixture from the opposite end of said series, and indirect heat exchanging means disposed in at least one of the chambers for exchanging heat between the contents of the chamber and an external medium.

READING BARLOW SMITH.